June 24, 1952 — M. E. HANSEN — 2,601,394
APPARATUS FOR IMPREGNATING CORD
Filed Feb. 1, 1947
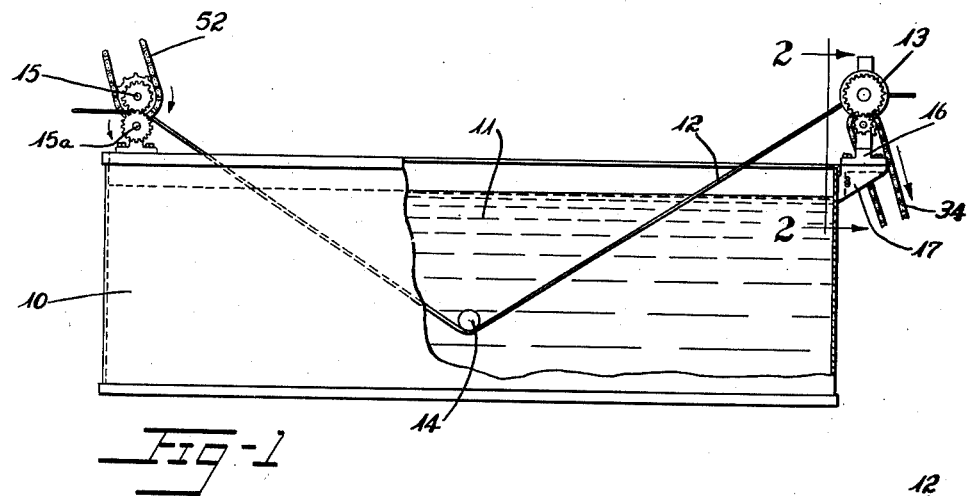
Fig-1
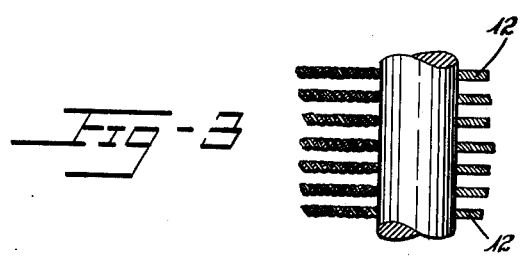
Fig-3
Fig-2
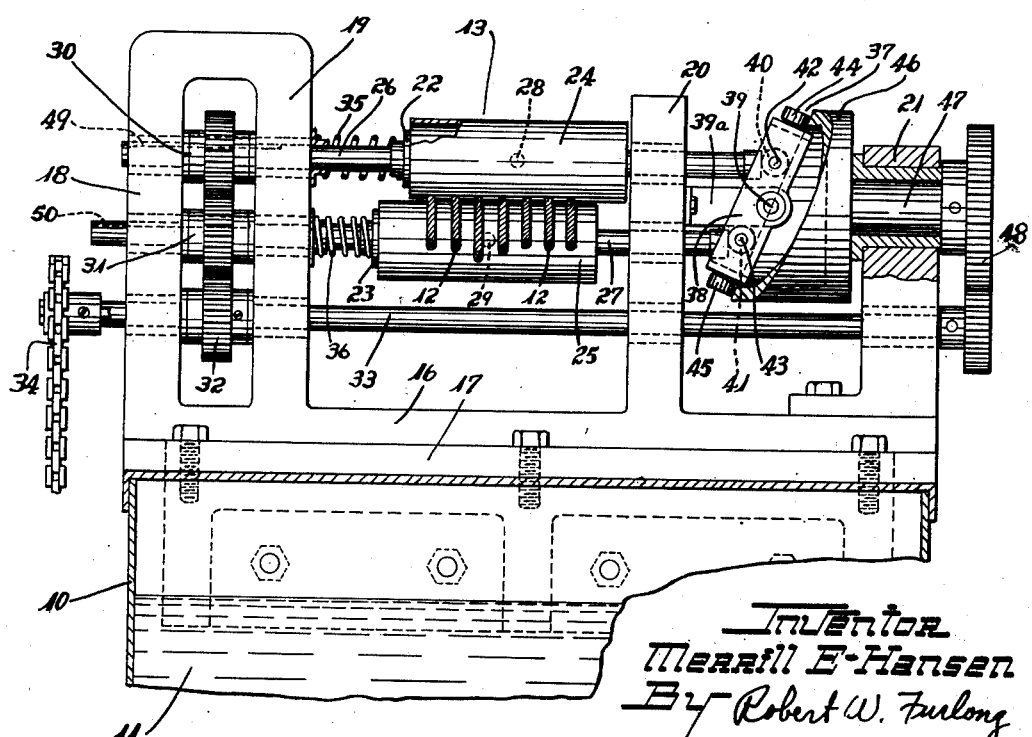
Inventor
Merrill E. Hansen
By Robert W. Furlong
Atty.

Patented June 24, 1952

2,601,394

UNITED STATES PATENT OFFICE 2,601,394

APPARATUS FOR IMPREGNATING CORD

Merrill E. Hansen, Silver Lake Village, Ohio, assignor, by mesne assignments, to The B. F. Goodrich Company, Akron, Ohio, a corporation of New York Application February 1, 1947, Serial No. 725,818

3 Claims. (Cl. 118—420)

This invention relates to a method of impregnating cord and apparatus therefor and particularly to a method of impregnating cord with a colloidal dispersion, such as latex, and a preferred apparatus therefor.

Twisted cord, such as multiple strand cotton or rayon cord, is readily surface coated with a material such as rubber by passing it through a colloidal dispersion of the material. In many cases, however, it is desirable to impregnate the cord as well as coat it with the colloidal material. The twisted cord resists such impregnation and usually only a surface layer is deposited. Several methods have been proposed to accomplish impregnation with latex, such as the method set forth by Ritzert in U. S. Pats. Nos. 2,040,105 and 2,077,492 in which cord immersed in latex is passed continuously about a series of vertical rollers disposed in a staggered line through the latex or the method taught by Whiffen in U. S. Pat. No. 1,745,285 in which the cord is flexed at a plurality of points while immersed in the latex.

This invention is concerned with impregnating dry cord with a colloidal dispersion by alternately untwisting and twisting the cord while immersed in the dispersion. It is an object of this invention to provide simple means for continuously accomplishing this impregnation, such means to be of a construction not readily subject to mechanical failure and adapted to be used with different sized cords with the change from one cord to another being quickly and easily accomplished. It is a further object of this invention to thoroughly impregnate the cord rather than to merely superficially coat it with the suspension.

A preferred method of impregnating cord and a preferred form of apparatus therefor is illustrated in the accompanying drawings of which:

Fig. 1 is a view in elevation, partly broken away and in section, of apparatus adapted to impregnate cord in accordance with this invention;

Fig. 2 is an enlarged view in elevation, partly broken away and in section, along line 2—2 of Fig. 1, showing the paired rotatable reciprocating rolls adapted to alternately untwist and twist cord passing therebetween; and Fig. 3 is a fragmentary view illustrating the change in condition of the cord upon passing between the reciprocating rolls.

In impregnating cord according to this invention, the alternate untwisting and twisting serves a twofold function. The untwisting operation mechanically separates the strands and also separates the individual threads in each strand allowing the latex to penetrate the cord. The twisting operation squeezes the excess latex out of the cord and when the cord is again untwisted the cord strands are moved through the latex allowing the latex to penetrate into the cord and effect complete impregnation.

With reference to a preferred method of effecting impregnation of cord according to this invention, the preferred apparatus (Fig. 1) comprises a dipping tank 10 adapted to hold a body of latex 11. A plurality of cords 12, 12 are continuously introduced into the latex 11 by means of a cord feed mechanism 13 adapted to alternately untwist and twist the cords thus introduced. The cords 12, 12 are guided through the latex 11 and kept immersed therein by an idler roll 14 positioned in the body of the latex which maintains the reach of the cord under slight tension while traversing the bath from the cord feed mechanism 13. The impregnated cords are continuously removed from the bath by paired squeeze rolls 15 and 15a which also remove excess latex from the cord passing therebetween.

The cord feed mechanism 13 comprises a support housing 16 mounted on a bracket member 17 attached to one end of the dipping tank 10. The housing 16 comprises four spaced upright members 18, 19, 20, and 21. Mounted between the inner pair of uprights 19 and 20 is a pair of squeeze rolls 22 and 23 having rubber roller surfaces 24 and 25 and secured to roll shafts 26 and 27 by means of pins 28 and 29. The roll shafts 26 and 27 are journaled in upright members 18, 19 and 20 and the gears 30 and 31 are loosely keyed thereto between the outer pair of uprights 18 and 19, long keyways 49 and 50 being provided in the shafts to permit gears 30 and 31 to slide longitudinally thereon while rotating with the shaft. Gears 30 and 31 which intermesh are actuated by drive gear 32 keyed to drive shaft 33 which is rotated by a chain and sprocket drive 34 from an external power source (not shown). Spiral compression springs 35 and 36 are mounted on the roll shafts 26 and 27 between squeeze rolls 22 and 23 and the upright 19.

The roll shafts 26 and 27 extend through the upright member 20 in which they are journaled and cooperate with the reciprocating means indicated generally by the numeral 37. The reciprocating means 37 comprises a generally rectangular rocker arm 38 rotatably mounted at its midpoint on a fulcrum pin 39 rigidly secured to upright 20 by means of bracket 39a. The ends of the roll shafts 26 and 27 respectively abut freely rotatable dolly wheels 40 and 41 which are mounted on pins 42 and 43 rigidly secured on the arm 38 midway between the central fulcrum pin 39 and the ends of the arm. Roller wheels 44 and 45 are journaled on each end of the arm 38 so as to bear upon the periphery of a rotatable truncated cylindrical cam 46 which presents a slanting face to the rocker arm 38. The cam 46 is keyed to shaft 47 which is journaled in upright member 21. The shaft 47 is rotated by means of a gear train 48 actuated by drive shaft 33.

The take-off rolls 15 and 15a also preferably comprise rubber covered squeeze rolls mounted on the opposite ends of the dipping tank 10 from the cord feed mechanism 13. The rolls are rotated by a chain and sprocket drive 52 from an external power source (not shown) and are synchronized with the cord feed 13 to maintain the cord under uniform tension. In passing between the take-off rolls the impregnated cord has excess latex squeezed therefrom. In operation, the rotating and reciprocating means of the cord feed mechanism are actuated by the same drive shaft 33. As the rolls are rotated, the truncated cylindrical cam 46 also rotates causing the rocker arm 38 to rock about the pin 39. The keyways 49 and 50 in the roll shaft allow the shafts to slide back and forth through the gears 30 and 31 and as the spring 36 on one shaft 27 is compressed by the inward thrust of one end of the rocker arm 38, the spring 35 on the other shaft 26 pushes the shaft against the outwardly moving end of the arm. This results in the rolls moving axially in opposite directions to untwist cord passing between the rolls. As the cam revolves, the axial motion of the rolls is reversed and the cord is twisted again. This reciprocating action effectively separates the threads of the cord and results in complete impregnation as set forth hereinabove. The rubber roll surfaces grip the cords so that they are rolled by the reciprocating action and the rubber surfaces are deformable to accommodate cords of various sizes.

The idler roll 14 preferably comprises a rubber covered roll rotatably mounted horizontally in the tank 10 by bracket means (not shown). The idler roll 14 maintains the cord in the latex under tension and is rotated by the movement of the cord through the latex. The roll 14 is preferably provided with circumferential grooves to prevent transverse motion of the cord and thus facilitate untwisting the cord. The degree of untwisting and retwisting to which the cord is subjected may be varied by varying the extent of reciprocation of the squeeze rolls or by varying the length of the reach of cord between the cord feed mechanism 13 and the idler roll 14. The number of times the cord is thus untwisted and retwisted while in the latex bath may be varied by changing the relative speed of rotation of the squeeze rolls and of the cam 46. Because the extent of reciprocation of the squeeze rolls 22 and 23 is the same in both directions the cord will be in its original condition of twist when it emerges from the tank and take-off rolls 15 and 16. In the case of tightly twisted cord it will of course be necessary to maintain the cord under higher tension than in the case of loosely twisted cord to insure complete untwisting and prevent kinking of the cord. It is desirable to maintain the latex in motion while impregnating the cord to sweep away the air which is forced out of the cord in the untwisting and retwisting operation.

The invention has been described with reference to latex impregnation but it is applicable to impregnating cord and similar twisted multiple strand materials with any colloidal dispersion such as natural or synthetic rubber latex or other colloidal suspensions comprising rubber, latices of materials such as polyvinyl chloride, polyvinylidene chloride, polyvinyl acetate or mixtures or copolymers of such materials and similar materials, as well as suspensions of resins such as urea-formaldehyde, phenol-formaldehyde, melamine resin and similar materials.

Such colloidal dispersions cannot readily penetrate twisted cords but have a tendency to deposit on the surface thereof and prevent further impregnation. By means of this invention, the individual threads of the multiple strand cord are mechanically separated to permit ready ingress of the dispersion into the body of the cord.

The apparatus for use in practising this invention is relatively simple and comprises no delicate mechanism subject to mechanical failure. A plurality of cords may be simultaneously impregnated in a continuous operation. The cord is readily threaded between the rolls so that a change from one type of cord to another is quickly and easily accomplished.

The invention has been described in considerable detail with reference to a preferred method of treating cord with latex and apparatus therefor but it will be understood that the method is applicable to impregnating any twisted multiple strand fiber article such as thread, rope, etc., with any colloidal suspension and that variations and modifications may be effected within the scope of the invention as defined in the appended claims.

I claim:

1. In an apparatus for impregnating textile cord with a liquid, in combination, a container for said liquid, a pair of counter-rotating rolls disposed above the level of said liquid, said rolls cooperating with each other to advance said cord therebetween, a second pair of counter-rotating rolls disposed above said liquid level spaced apart from the first said pair to receive said cord and to maintain a reach of said cord under tension between said spaced pairs of rolls, means for rotating said rolls, means disposed beneath the surface of said liquid in said container between said spaced pairs of rolls for maintaining an intermediate portion of said advancing tensioned reach of cord immersed in said liquid, and means for reciprocating the rolls of the first said pair axially with respect to each other while said cord is advancing.

2. In an apparatus for impregnating textile cord with a liquid, in combination, a container for said liquid, a pair of counter-rotating rolls disposed above the level of said liquid, said rolls cooperating with each other to advance said cord therebetween, a second pair of counter-rotating rolls disposed above said liquid level spaced apart from the first said pair to receive said cord and to maintain a reach of said cord under tension between said spaced pairs of rolls, means for rotating said rolls, an idler roll disposed beneath the surface of said liquid between said pairs of rolls to maintain at least a portion of said tensioned reach of cord immersed in said liquid, and cam means for reciprocating the rolls of the first said pair axially with respect to each other while said cord is advancing.

3. In an apparatus for impregnating textile cord with a liquid, in combination, a container for said liquid, a pair of counter-rotating rolls disposed adjacent a margin of said container above the level of said liquid, said rolls cooperating with each other to advance said cord therebetween, a second pair of counter-rotating rolls disposed adjacent an opposite margin of said container spaced apart from the first said pair above said liquid level to receive said cord and to maintain a reach of said cord under tension between said spaced pairs of rolls, means for rotating said rolls, an idler roll disposed beneath the surface of said liquid in said container between said spaced pairs of rolls for maintaining an intermediate portion of said advancing tensioned reach of cord immersed in said liquid, and cam means for reciprocating the rolls of the first said pair axially with respect to each other while said cord is advancing.

MERRILL E. HANSEN.

REFERENCES CITED

The following references are of record in the file of this patent:

UNITED STATES PATENTS

| Number | Name | Date |
|---|---|---|
| 166,601 | Furbush | Aug. 10, 1875 |
| 212,102 | Mallison | Feb. 11, 1879 |
| 874,287 | Bayne | Dec. 17, 1907 |
| 1,197,396 | Price | Sept. 5, 1916 |
| 1,492,316 | Wardwell | Apr. 29, 1924 |
| 1,745,285 | Whiffen | Jan. 28, 1930 |
| 1,877,488 | Allen | Sept. 13, 1932 |
| 2,370,314 | Jenner | Feb. 27, 1945 |

FOREIGN PATENTS

| Number | Country | Date |
|---|---|---|
| 531,910 | Germany | 1931 |